United States Patent
Adams et al.

(10) Patent No.: US 11,089,654 B2
(45) Date of Patent: Aug. 10, 2021

(54) UNIVERSAL NARROW-BAND INTERNET OF THINGS COMMUNICATION NODE FOR USE WITH ENVIRONMENTAL SENSORS AND STATIONS

(71) Applicant: DISH Network L.L.C., Englewood, CO (US)

(72) Inventors: Alexander Adams, Denver, CO (US); Richard Reisbick, Westminster, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/215,564

(22) Filed: Dec. 10, 2018

(65) Prior Publication Data

US 2020/0177692 A1 Jun. 4, 2020

Related U.S. Application Data

(60) Provisional application No. 62/773,504, filed on Nov. 30, 2018.

(51) Int. Cl.
*H04W 88/16* (2009.01)
*H04L 29/08* (2006.01)
*H04L 1/18* (2006.01)

(52) U.S. Cl.
CPC .......... *H04W 88/16* (2013.01); *H04L 1/1861* (2013.01); *H04L 67/025* (2013.01); *H04L 67/04* (2013.01);
(Continued)

(58) Field of Classification Search
CPC ............... H04L 67/2809; H04L 67/125; H04L 67/2857; H04L 1/1861; H04L 67/025; H04L 67/04; H04L 69/329; H04W 88/16
See application file for complete search history.

(56) References Cited

U.S. PATENT DOCUMENTS

| | | | |
|---|---|---|---|
| 8,816,879 B2 | 8/2014 | Stefik et al. | |
| 8,823,520 B2 * | 9/2014 | Ly | H04L 67/34 340/540 |
| 2002/0027499 A1 | 3/2002 | Chainer et al. | |

(Continued)

FOREIGN PATENT DOCUMENTS

WO 2017/107123 A1 6/2017

OTHER PUBLICATIONS

International Search Report and Written Opinion for PCT/US2019/063847 dated Feb. 25, 2020, all pages.

(Continued)

*Primary Examiner* — Patrice L Winder
*Assistant Examiner* — Aye M Aung
(74) *Attorney, Agent, or Firm* — Kilpatrick Townsend & Stockton LLP (57) ABSTRACT

Various arrangements involving environmental sensor gateways are presented. Wire terminals of the environmental sensor gateway may be connected with wires that are electrically connected with environmental sensors. Multiple communication interface protocols used by the environmental sensors connected via the wires may be determined. One or more operator-specific applications may be executed. Each operator-specific application may be mapped to a corresponding environmental sensor. Environmental sensor measurements may be received from the environmental sensors via the wire terminals. Based on a wire terminal through which an environmental sensor measurement is received, the environmental sensor measurement may be processed using an operator-specific application. The environmental sensor measurement may be processed using the operator-specific application.

12 Claims, 4 Drawing Sheets

(52) U.S. Cl.
CPC ........ *H04L 67/125* (2013.01); *H04L 67/2809* (2013.01); *H04L 67/2857* (2013.01); *H04L 69/329* (2013.01)

(56) References Cited

U.S. PATENT DOCUMENTS

| | | | |
|---|---|---|---|
| 2008/0274766 A1* | 11/2008 | Pratt | H04W 56/0015 |
| | | | 455/552.1 |
| 2008/0294020 A1* | 11/2008 | Sapounas | G16H 50/20 |
| | | | 600/301 |
| 2010/0085948 A1* | 4/2010 | Yu | H04L 45/123 |
| | | | 370/338 |
| 2013/0073350 A1 | 3/2013 | Blustein | |
| 2013/0311140 A1* | 11/2013 | Schechter | H04W 4/50 |
| | | | 702/188 |
| 2014/0072178 A1 | 3/2014 | Carbonell et al. | |
| 2015/0310745 A1 | 10/2015 | Osment | |
| 2015/0369618 A1 | 12/2015 | Barnard et al. | |
| 2015/0381737 A1 | 12/2015 | Quinn et al. | |
| 2017/0025008 A1 | 1/2017 | Gignac et al. | |
| 2017/0092130 A1 | 3/2017 | Bostick et al. | |
| 2017/0129483 A1 | 5/2017 | Li et al. | |
| 2017/0134536 A1 | 5/2017 | Tessiore et al. | |
| 2017/0148230 A1 | 5/2017 | Richard | |
| 2018/0198641 A1* | 7/2018 | Gilani | G08B 25/004 |
| 2018/0351761 A1* | 12/2018 | Li | H04L 69/08 |
| 2019/0122050 A1 | 4/2019 | Beals et al. | |

OTHER PUBLICATIONS

International Search Report and Written Opinion for PCT/US2019/063529 dated Feb. 21, 2020, all pages.

* cited by examiner

UNIVERSAL NARROW-BAND INTERNET OF THINGS COMMUNICATION NODE FOR USE WITH ENVIRONMENTAL SENSORS AND STATIONS

CROSS-REFERENCES TO RELATED APPLICATIONS

This application claims priority to U.S. Pat. App. No. 62/773,504, entitled "Host-Neutral Gateway Processing System", filed on Nov. 30, 2018, the entire disclosure of which is hereby incorporated by reference for all purposes.

BACKGROUND

Environmental sensors can be useful to monitor the environmental conditions in various locations, both indoors and outdoors. Many environmental sensors communicate using disparate wired communication protocols. In order to report environmental measurements to a remote server system, wired environmental sensors may be required to be in wired communication with a network- or Internet-connected device.

SUMMARY

Various arrangements of environmental sensor gateways are presented herein. In such embodiments, a plurality of wire terminals of the environmental sensor gateway may be connected with a plurality of wires that are electrically connected with a plurality of environmental sensors. A plurality of communication interface protocols used by the plurality of environmental sensors connected via the plurality of wires with the plurality of wire terminals may be determined. A plurality of operator-specific applications may be executed by the environmental sensor gateway. Each operator-specific application may be mapped to a corresponding environmental sensor of the plurality of environmental sensors. Environmental sensor measurements may be received from the plurality of environmental sensors in the determined plurality of communication interface protocols via the plurality of wire terminals. The environmental sensor measurement may be determined to be processed using an operator-specific application based on a wire terminal of the plurality of wire terminals through which an environmental sensor measurement was received. The environmental sensor measurement may then be processed using the operator-specific application.

In various embodiments, one or more of the following features may be present: The environmental sensor measurement may be caused to be transmitted to a remote server. A long-range communication interface may be selected from the plurality of long-range communication interfaces to transmit the environmental sensor measurement to the remote server. The environmental sensor measurement may be caused to be stored by the environmental sensor gateway device based on an instruction of the operator-specific application. The stored environmental sensor measurement may be transmitted as part of a batch transfer of environmental sensor measurements to a remote server. The environmental sensor measurement may be combined with a plurality of other environmental sensor measurements received via the wire terminal. The combined environmental sensor measurements may be transmitted a remote server. A determination to process the environmental sensor measurement using the operator-specific application based on a locally-stored communication routing table may be made.

DETAILED DESCRIPTION

In various circumstances, an entity, such as a company, organization, or person, may desire to have wired environmental sensors or other forms of wired sensors deployed that output measurements via a wired communication arrangement. It may be difficult or inefficient for a device that receives the sensor measurements from the one or more wired environmental sensors to obtain a network connection to a remote server or the Internet. A gateway device may be used to connect with the environmental sensor devices and allow for sensor measurements to be transmitted to one or more remote servers.

In some situations, the wired sensors may create a significant amount of data and/or a stream of sensor data that is not efficient to transmit back to a remote server system, especially if the sensors or devices are located in a remote location from which bandwidth is at a premium. An environmental sensor gateway device may be able to execute one or more applications that are specific to the entity that operates the sensors or devices. Such an application may perform processing on the data received from the sensors and may be able to respond to sensors or devices. By processing the data at the environmental sensor gateway device, the volume and/or frequency of data needing to be transmitted to the entity's remote server system may be decreased.

Such a gateway device may be able to communicate using multiple different wired communication protocols with a variety of types and/or makes of sensors that are concurrently connected with the gateway device. The environmental sensor gateway device may be able to communicate with environmental sensors that are operated by multiple different operators. Further, the gateway device may be able to communicate using multiple long-range wireless and/or wired communication protocols to communicate with remote server systems and/or the Internet. Further, preferences for the particular long-range wireless communication method to be used may be defined (e.g., one long-range method may be faster, but more costly than another).

The gateway device may be designed in such a manner that it is situated within a single, waterproof housing that can be placed outdoors in a convenient location. Multiple environmental sensors may be wired to the wire terminals of the gateway device. The gateway device may then sense or be configured for the particular wired communication protocol being used by the connected environmental sensor. Depending on which environmental measurements from which environmental sensor are received, the sensor measurements may be processed differently, such as immediately transmitted to a remote server, stored for later transmittal, combined (e.g., averaged) and transmitted to a remote server, discarded, etc.

Figure 1:
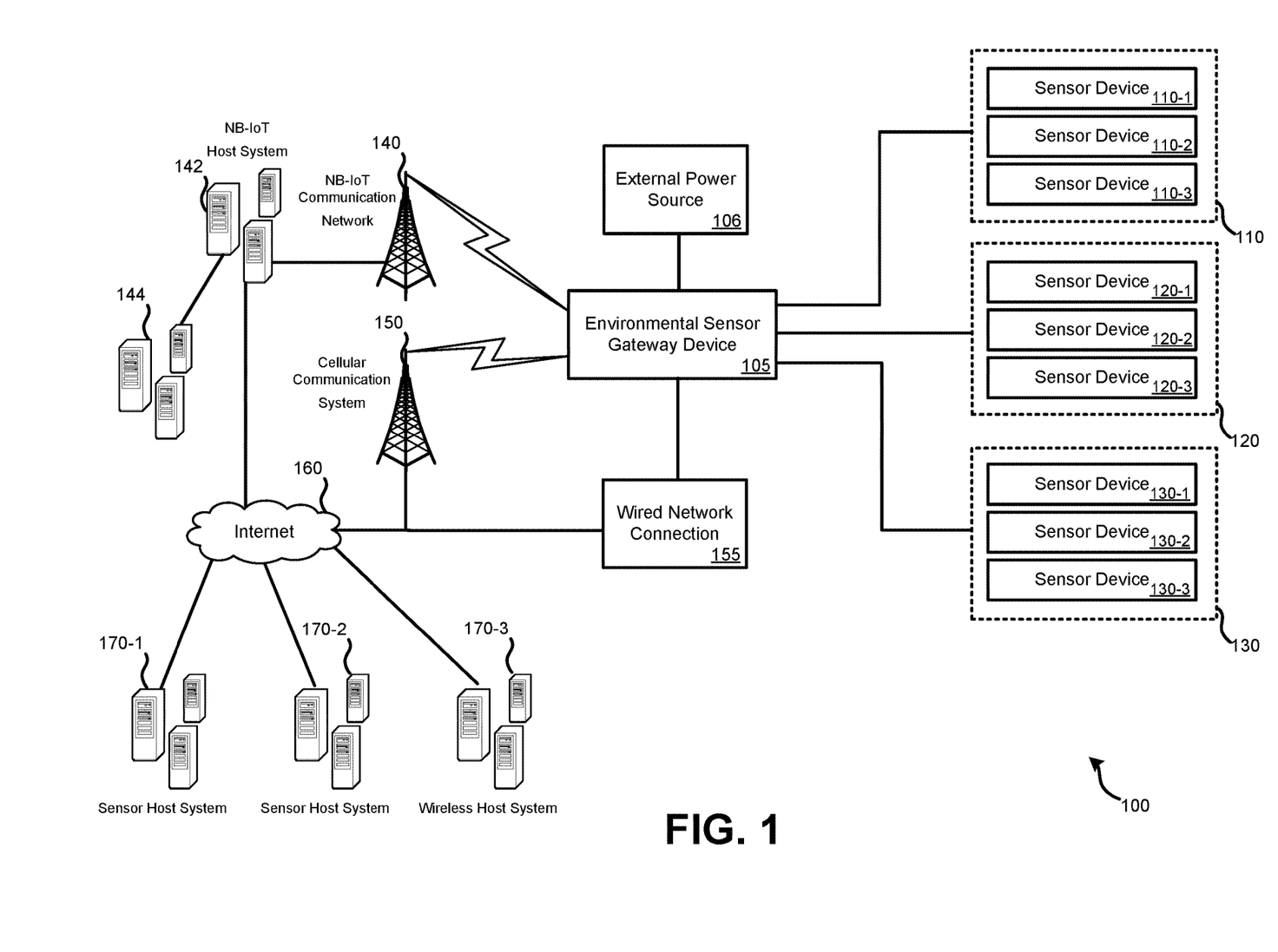
FIG. 1 illustrates an embodiment of a communication system that uses a wired environmental sensor gateway device for processing and routing sensor measurements.

Further details regarding such a gateway device is provided in relation to the figures. In the following description, an "operator" refers to an entity that deploys and operators environmental sensor devices or other forms of wired communication devices. Such devices may be capable of unidirectional or bidirectional communication. An operator may be a company, organization, or individual or group of persons. For example, a first operator may deploy environmental sensors to monitor the weather in a geographic region, while a second operator may deploy environmental sensors to monitor for pollution. Both the sensors of the first and second entity may communicate with a same gateway device. FIG. 1 illustrates an embodiment of a communication system that uses a wired environmental sensor gateway device for processing and routing communications. Communication system 100 may include: environmental sensor gateway device 105; sensor devices 110 (110-1, 110-2, 110-3); sensor devices 120 (120-1, 120-2, 120-3); sensor devices 130 (130-1, 130-2, 130-3). NB-IoT system 140; NB-IoT host system 142; NB-IoT direct-link server system 144; cellular communication system 150; wired network connection 155; the Internet 160; and host systems 170 (170-1, 170-2, and 170-3).

Environmental sensor gateway device 105 (also referred to as "gateway device 105") may serve as a gateway between sensor devices 110, sensor devices 120, sensor devices 130, the Internet, and host systems 170. Gateway device 105 may perform local processing and routing among such devices and systems. Further detail regarding gateway device 105 is provided in relation to FIG. 2.

Gateway device 105 may communicate with various wired (and, possibly, wireless) sensor devices and other forms of wireless devices. Such sensor devices may be operated by different operators. That is, sensors devices 110 may be operated by a different operator and be unrelated to sensors devices 120 and sensor devices 130. Gateway device 105 may keep data from sensor devices 110 wholly separate from data related to sensor devices 120 and sensor devices 130. The function of sensor devices 110, sensor devices 120, and sensor devices 130 may vary. Functions that may be possible include: various forms of environmental sensors, temperature sensors, humidity sensors, anemometers, air quality sensors, hydrology sensors, agriculture sensors, motion sensors, pollution sensors, hazard sensors, etc. Different sensors devices may communicate according to different wired communication protocols. For example, sensor devices may use SDI-12, RS-232, RS-485, Modbus, etc. to communicate via a wire with a separate device. Environmental sensor gateway device 105 may be able to communicate with multiple sensor devices that use different wired communication protocols.

In the illustrated embodiment of FIG. 1, three sensors devices 110, three sensor devices 120, and three sensor devices 130 are illustrated as an example. Each of these groups of sensors may be operated by different operators. Such numbers and groups of sensor devices are only examples. Gateway device 105 may communicate with between one and scores of sensor devices associated with a particular operator or multiple operators. As a simple example, a first operator may deploy several hydrology sensors that use a first wired communication protocol to communicate with gateway device 105 while a second operator may deploy an air quality sensor that communicates using a different wired communication protocol with the gateway device 105. In other embodiments, only a single operator may operate environmental sensors that are wired with gateway device 105.

As illustrated, only one gateway device, gateway device 105, is present. Many additional gateway devices may be deployed in a geographically-dispersed arrangement that each communicate with differing groups of sensors and/or wireless devices, operated by one or more different operators. Each of gateway devices may have one or more possible communication methods with Internet 160 and host systems 170.

Gateway device 105 may be able to communicate via one or more communication methods with remote networks and host systems. In the illustrated embodiment, gateway device 105 can communicate with Narrowband Internet-of-Things (NB-IoT) network 140. NB-IoT network 140 may permit low-bandwidth communication over a relatively large distance from a single communication tower. For instance, an NB-loT network may allow for 250 kilobits per second over a single narrow-band, such as of 200 kHz. NB-IoT network 140 may communicate with NB-IoT host system 142. NB-IoT host system 142 may provide for additional processing capabilities on data obtained from sensor devices and wireless devices that communicate with gateway device 105. Additionally or alternatively, NB-IoT host system 142 may server as an interface between NB-loT network 140 and the Internet 160. In some embodiments, a server system 144 may be connected with NB-IoT host system 142 via a communication arrangement other than the Internet, such as a private local area network (LAN). Server system 144 may be operated by a particular operator and may receive and process data from a particular group of associated sensors or wireless devices.

Gateway device 105 may additionally or alternatively be able to communicate with Internet 160 via cellular communication system 150. Gateway device 105 may use a 3G, 4G, 5G, 6G, LTE, or some other form of cellular network to access the Internet 160. In some embodiments, such a communication arrangement may be significantly higher bandwidth than NB-IoT network 140, but may be more expensive to access. Additionally or alternatively, gateway device 105 may have a wired network connection 155, such as via an Ethernet, to communicate with Internet 160. Alternatively or additionally, other forms of communication to access the Internet 160 are possible. For example, in some embodiments, gateway device 105 may use a Wi-Fi connection to access Internet 160 or a wide-area wireless network.

Various host systems, such as sensor host system 170-1, sensor host system 170-2, and wireless host system 170-3 may communicate with sensor devices 110, sensor devices 120, and sensor devices 130, respectively via Internet 160 and gateway device 105. Since each group of sensor devices are operated by distinct operators, each group may communicate with a different host system. For example, sensor devices 110 may only communicate with sensor host system 170-1; sensor devices 120 may only communicate with sensor host system 170-2; and wireless host system 170-3 may only communicate with sensor devices 130. In some embodiments, sensor devices may also access third-party resources via Internet 160 (and, thus, may not be restricted to communicating with an associated host server system).

Host systems 170 may also be permitted to initiate communicates with associated environmental sensor devices. Therefore, for example, if a firmware update is to be provided to sensor device 110-2, sensor host system 170-1 may send the update for communication to sensor device 110-2 to gateway device 105, which in turn sends the update to sensor device 110-2.

In some embodiments, an external power source 106 may be used to power environmental sensor gateway device 105. For example, the external power source 106 may be one or more solar panels. Such solar panels may be paired with one or more batteries that store power. Wind and geothermal power supplies are other options. The external power source may also be a grid-based power source.

Figure 2:
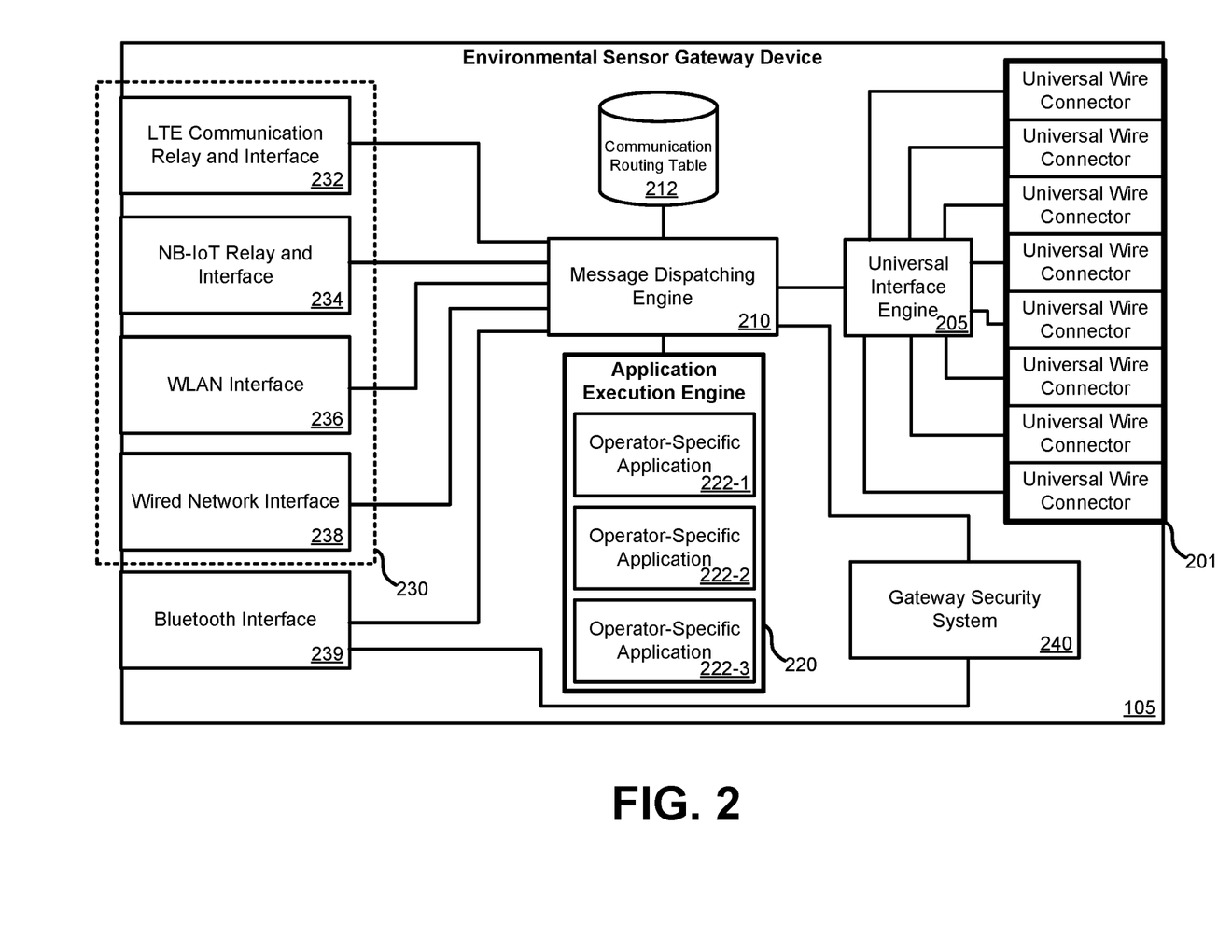
FIG. 2 illustrates a block diagram of an embodiment of a wired environmental sensor gateway device.

FIG. 2 illustrates a block diagram of an embodiment of a wired environmental sensor gateway device 200. Gateway device 105 may be implemented as a device in a single housing. Gateway device 105 may be configured to be installed outdoors or indoors. The housing of gateway device 105 may be waterproof for an outdoors installation. Gateway device 105 may be installed outdoors in a location that is unlikely to be interfered with by people and is likely to have few obstacles between its communication interfaces and the sensor or device with which it communicates. For example, gateway device 105 may be installed on a telephone pole at an elevated location.

Gateway device 105 may include: universal wire connectors 201. Universal wire connectors 201 may include multiple wire terminals that allow wires from one or more environmental sensors to be connected with gateway device 105. Each of these universal wire connectors may be attached and detached from wires. Each of these universal wire connectors 201 may be protocol-agnostic. The number of universal wire connectors may vary by embodiment, for example, an embodiment may have between 2 and 200 universal wire connectors.

Universal interface engine 205 may translate various wired communication protocols into a standard data format that can be interpreted by message dispatch engine 210. Universal interface engine 205 may detect the communication protocol of environmental measurements being received via each of the universal wire connectors. Alternatively, a user may perform a configuration process during which the user indicates a wired communication protocol associated with each of the universal wire connectors. Universal interface engine 205 may include one or more processors, which may be the same processors that are used to perform the functions of other components of gateway device 105, such as message dispatching engine 210. In some embodiments, universal interface engine 205 may packetize data received via universal wire connectors 201 and may attach header information to each measurement that is indicative of the source of the sensor measurement. In some embodiments, one or more of the environmental sensors may continuously output measurements. Universal interface engine 205 may periodically sample the output measurements and pass a sampled measurement to message dispatching engine 210 along with an indication of the universal wire connector on which the measurement was sampled.

In some embodiments, it is possible that one or more wireless communication interfaces may be present to allow communication with environmental sensors or other forms of sensors other than wired sensors. For example, Bluetooth Low Energy (BLE), Wi-Fi, or some other local direct or network-based wireless communication protocol may be used.

Message dispatching engine 210 may communicate with universal interface engine 205. Environmental measurements may be output by universal interface engine 205 may be routed to message dispatching engine 210. Message dispatching engine 210 may be implemented using special-purpose hardware, such as one or more special-purpose processors. Alternatively, message dispatching engine 210 may be implemented as firmware or software that is executed by one or more general-purpose processors. Message dispatching engine 210 may analyze a received messages from universal interface engine 205 and determine: 1) whether to transmit to a remote server system; 2) if yes, which long-range communication interface to use; and 3) determine whether local processing is to be performed by an associated operator-specific application. Message dispatching engine 210 may analyze a received message header based on data stored in communication routing table 212.

Each measurement output by universal interface engine 205 may be converted to a standard format and have information appended (e.g., in the form of a header) that indicates the one or more universal wire connectors (or the environmental sensor device) from which the measurement was received. Message dispatching engine 210 may store communication routing table 212 that indicates how measurements received via particular universal wire connectors (or from particular environmental sensor devices) is to be handled.

Communication routing table 212 may map particular sensor devices or universal wire connectors to a particular operator-specific application or sensor host system. By performing a look-up in communication routing table 212, message dispatching engine 210 can determine where the message is to be routed.

As illustrated, when a formatted measurement is received from universal interface engine 205, message dispatching engine 210 may be used to perform a look-up in communication routing table 212 to determine how the received measurement data should be handled. Message dispatching engine 210 may: 1) pass the data to an operator-specific application that has been mapped to the universal wire connector(s) or environmental sensor device; or 2) cause the data to be transmitted to a remote distance via one of long-range communication interfaces 230.

In some embodiments, if the measurement is to be transmitted to a remote server system, communication routing table 212 may indicate for the particular universal wire connectors or environmental sensor, one or more preferred long-range communication interfaces. If one of the preferred long-range communication interfaces is available, it may be used for communication. If no communication interface is specified, a default long-range communication interface that is available may be used. While a preference may be provided for particular long-range communication method, message dispatching engine 210 may make the ultimate decision as to the long-range communication method used. This decision may be based on the quantity and urgency of the data to be transmitted.

Application execution engine 220 may receive measurements from message dispatching engine 210 and pass a received measurement (e.g., in the form of a data packet) to the appropriate operator-specific application based on communication routing table 212. In the illustrated examiner, application executing engine is executing three operator-specific applications 222 (222-1, 222-2, and 222-3). Each operator-specific application may be code supplied by the operator and executed by application execution engine 220 on behalf of the operator. From a remote server system, such as host systems 170 and server system 144, operator-specific application code may be transmitted to gateway device 105 for execution. This code may be executed by the gateway device and can only interact with data received from the corresponding operator and the operator's environmental sensors that are connected with gateway device 105 via universal wire connectors 201. Each operator-specific application may perform some level of processing on some or all measurement data received from a sensor device or wireless device associated with that operator. Each operator-specific application may communicate with the Internet and/or a corresponding host system via message dispatching engine 210.

By having an operator-specific application perform processing on received measurement data from an environmental sensor device, communication via long-range communication interfaces may be decreased or avoided entirely. Such an arrangement may save on data transmission costs and/or decrease the amount of processing required to be performed by the operator's server system. As a first example, an operator-specific application may gather data from one or more sensor devices over a period of time and report a summary of the data to an associated host system of the operator. More specifically, one or more temperature sensor devices may report temperature measurements every second. The operator-specific application may receive this measurements each second through message dispatching engine 210, and determine a high, low, and average temperature that is then transmitted to the associated host system once per minute. As a second example, an operator-specific application may be able to process received data from one or more sensor devices and avoid the need to communicate using long-range communication interfaces at all. As an example of this, one or more humidity sensors may report humidity measurements once every five seconds. The operator-specific application may compare the humidity measurements to a stored set of thresholds; unless the humidity measurements fall outside of a range defined by the stored thresholds, no humidity measurements may need to be transmitted to a remote server system.

Long-range communication interfaces 230 may include: LTE (Long Term Evolution) communication relay and interface 232; NB-IoT relay and interface 234; WLAN interface 236; and wired network interface 238; Each of long-range communication interfaces 230 may be connected with an appropriate antenna. These exemplary interfaces are by way of example only. LTE communication relay and interface 232 may allow message dispatching engine 210 to transmit and receive messages via an LTE network. Additionally or alternatively, another cellular data communication standard may be used, such as 3G, 4G, 5G, etc. In some embodiments LTE communication relation and interface 232 may serve as a repeater or relay to extend the LTE network. Therefore, other devices capable of communication using the LTE network may be able to utilize the network when such other devices are within range to communicate with LTE communication relay and interface 232 but are out of range of the cellular tower with which LTE communication relay and interface 232 communicates.

NB-IoT communication relay and interface 234 may allow message dispatching engine 210 to transmit and receive messages via an NB-IoT network. In some embodiments NB-IoT communication relation and interface 234 may serve as a repeater or relay to extend the NB-IoT network. Therefore, other devices capable of communication using the NB-IoT network may be able to utilize the network when such other devices are within range to communicate with NB-IoT communication relay and interface 234 but are out of range of the cellular tower with which NB-IoT communication relay and interface 234 communicates.

Other long-range interfaces include: WLAN interface 236 and wired network interface 238. WLAN interface 236 may allow for access to the Internet via a Wi-Fi network. Wired network interface 238 may allow for access to the Internet via a wired network, such as an Ethernet connection. It should be understood that additional or fewer long-range communication interfaces may be present in other embodiments. Further, despite a long-range communication interface being present in gateway device 105, such a long-range communication interface may not be connected or able to access a network. For instance, if gateway device 105 is placed in a rural area may only have access to an NB-IoT network. As another example, if gateway device 105 is installed in a suburban area, it may only have access to an NB-IoT network and an LTE network.

Bluetooth interface 239 may be used for local access, such as by a service technician that needs to disable gateway security system 240. Gateway security system 240 may prevent unauthorized persons from opening gateway device 105, changing firmware or software installed on gateway device 105, repurposing gateway device 105, or moving gateway device 105 to another location. Gateway security system may include a GPS sensor (to monitor location) and a door monitor (to monitor if an access door or panel to gateway device 105 is opened).

Figure 3:
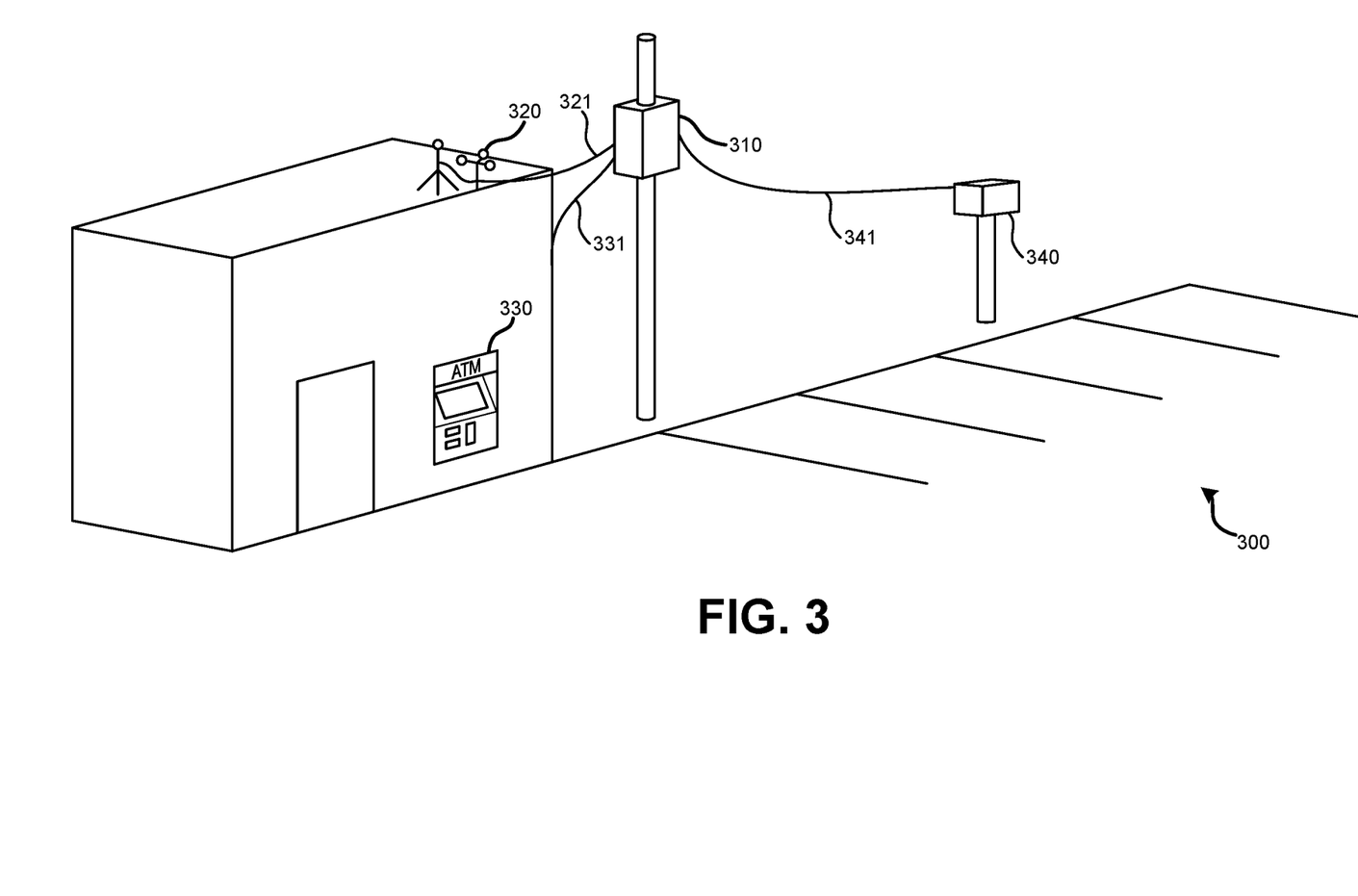
FIG. 3 illustrates an example of an environment in which a wired field-deployable environmental sensor gateway device may be deployed and used.

FIG. 3 illustrates an example of an environment in 300 which a wired field-deployable environmental sensor gateway device may be deployed and used. In environment 300, a gateway device 310 is attached to a light pole or telephone pole. In some embodiments, gateway device 310 may only receive power when a light attached to the light pole is powered on. Gateway device 310 may use this power to charge an on-board battery, which may be used to power gateway device 310 when the light is powered off. In other embodiments, gateway device 310 may be wired to a power source that typically is available or is available intermittently, such as solar panels. Gateway device 310 may be positioned in a location that makes it difficult for it to be accessed or stolen.

Gateway device 310 may provide Internet access and/or access to one or more remote servers to: weather station 320; automated teller machine (ATM) 330; and pollution sensor 340. Weather station 320 may be connected with gateway device 310 via wire(s) 321; ATM 330 may be connected with gateway device 310 via wire(s) 331; and pollution sensor 340 may be connected with gateway device 310 via wire(s) 341. Some or all of these devices may use different wired communication protocols. Further, some of the devices that communicate with gateway device 310 may not be sensor devices. For example, ATM 330 may be used to conduct financial transactions.

Figure 4:
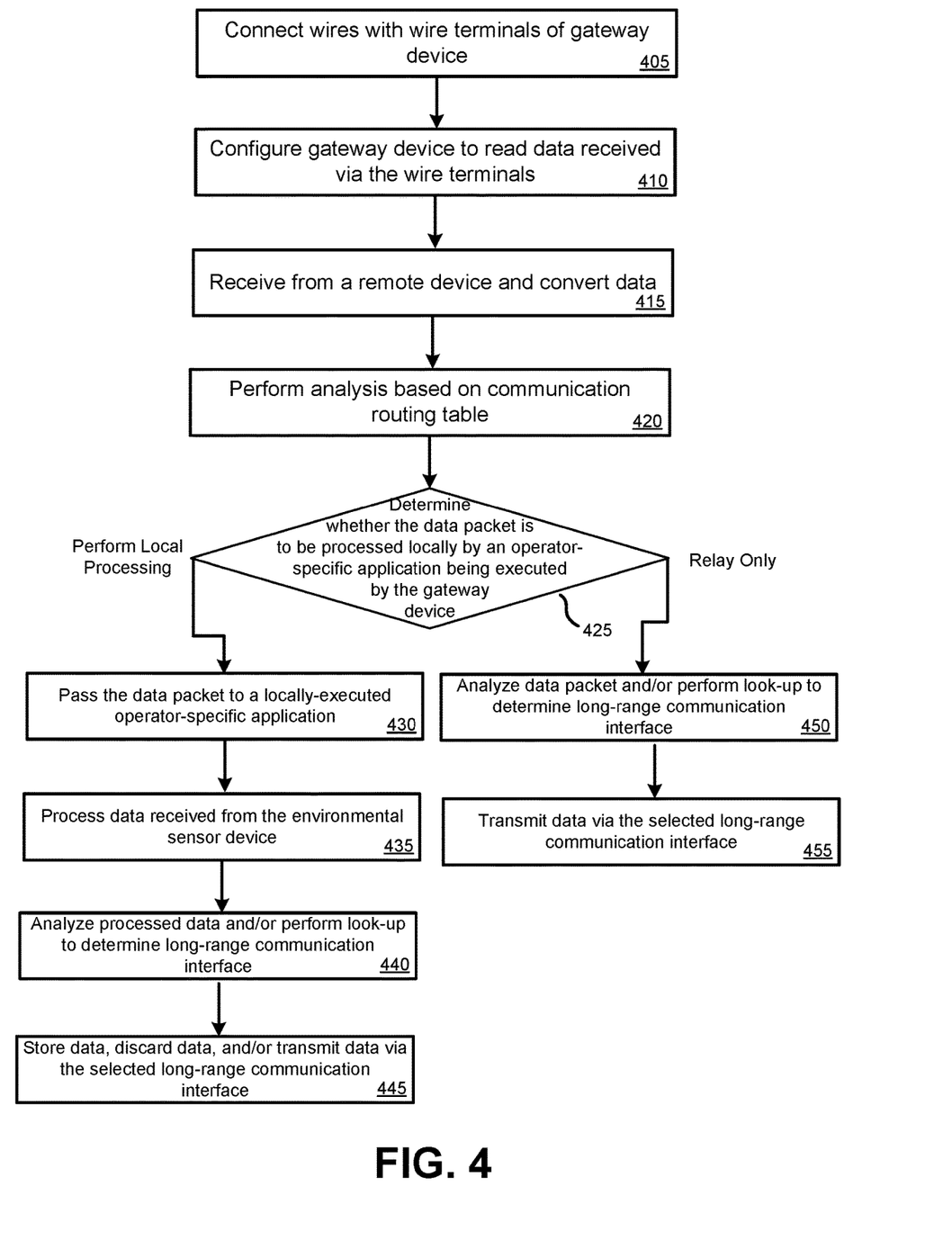
FIG. 4 illustrates an example of a method which may be performed by a wired environmental sensor gateway processing device.

FIG. 4 illustrates an embodiment of a method 400 which may be performed by a wired environmental sensor gateway processing device. Method 400 may be performed using communication system 100 of FIG. 1 with the environmental sensor gateway device 105 detailed in relation to FIGS. 1-3. At block 410, wires from environmental sensor devices may be connected with universal wire terminals of a gateway device. This may involve a person screwing or otherwise securing the wires to the wire terminals. At block 415, the gateway device may be configured to read data received via the wire terminals from the environmental sensors. In some embodiments, a user may provide input to the gateway device, such as via an administrator terminal connected with the gateway device, that defines: 1) the environmental sensor device that is connected with each wire terminal; 2) the communication protocol for each wire terminal; 3) the operator that operates each environmental sensor; 4) how frequently measurements from the environmental sensor should be sampled; 5) whether an operator-specific application is to process received measurements from the environmental sensor; 6) an address of a remote server to which measurements should be transmitted; and 7) the frequency at which the measurement data should be transmitted to the remote server. In other embodiments, rather than a user providing configuration data regarding communication protocol to the gateway device, the gateway device may sense the communication protocol being used to output data from the environmental sensor.

At block 415, a sensor measurement may be received via the wire terminal connected with the environmental sensor device. A sensor measurement may be read from the signal output to the one or more wire terminals and may be converted into a standard format from the communication protocol used by the environmental sensor to output the measurement. Data may be appended to the measurement that indicates the source of the measurement, such as the wire terminal or the environmental sensor from which the measurement was received.

At block 420, analysis may be performed by the gateway device on the received measurement as converted at block 415. The converted data, which can indicate the environmental sensor or the wire terminal through which the measurement was received may be compared to entries in a communication routing table. The communication routing table may be used to determine how the data is to be handled by the gateway device. Based on the analysis of block 420, the gateway device may determine whether the measurement data is to be processed locally using an associated operator-specific application that is being executed by the gateway device or if the measurement data is to be transmitted via a long-range communication interface to a remote server or third-party resource via the Internet at block 425.

If the measurement data is to be relayed via a long-range communication interface to a remote server or third-party resource via the Internet, the communication routing table may be analyzed to determine whether a preferred long-range communication interface is identified for data received from the environmental sensor or via the wire terminal at block 450. The gateway device may make the final decision on which long-range communication interface is to be used for communication. However, if the gateway device determines that multiple long-range communication interfaces are available, the preference indicated for the environmental sensor or wire connector in communication routing table 212 may be used. In some embodiments, the gateway device may store defined parameters on the long-range communication interface that is to be used based on: 1) the amount of data being transmitted; and 2) a determined urgency of the data. For instance, if the amount of data to be transmitted in association with the measurement data is above a threshold, a long-range communication interface, such as an NB-IoT interface, may be disqualified, unless no other long-range communication interface is available. In some embodiments, rather than the communication routing table indicating a long-range communication interface, a default long-range communication interface may be selected by the gateway device, such as based on: which long-range communication interfaces are available, and the amount of data to be transmitted. At block 455, the measurement data may be transmitted using the selected long-range communication interface in the form of a series of packets.

Alternatively, at block 425, if the gateway device determines that an operator-specific application is mapped to the sensor measurement, the converted measurement may be passed to an application execution engine that provides the measurement to the appropriate operator-specific application at block 430. Once routed to the operator-specific application, the operator-specific application manages the measurement data. Possible actions that may be performed by the operator-specific application can include: 1) performing processing on the measurement data (e.g., averaging the data, determining a maximum, minimum, median, etc.); 2) determine a response to be sent to the environmental sensor from which the measurement data originated; 3) determine a message to be sent to another device with which the gateway device communicates; 4) store the measurement data (e.g., for later transmission as part of a batch transfer); 5) do nothing; and/or 6) transmit measurement data to a remote server system or third party resource.

At block 435, the measurement data may be processed by the operator-specific application, such as to determine the mean of one or more values present in the measurement data in combination with earlier measurements. Other forms of processing may include comparison to one or more stored thresholds.

At block 440, the operator-specific application may determine that data is to be transmitted via a long-range communication interface to a remote server or third-party resource via the Internet. This data may include or at least be partially based on the measurement data received at block 415. The operator-specific application may use a set of operator-defined conditions to determine a preferred long-range communication interface. The gateway device may make the final decision on which long-range communication interface is to be used for communication. However, if the gateway device determines that multiple long-range communication interfaces are available, the preference indicated by the operator-specific application may be used. In some embodiments, the gateway device may store defined parameters on the long-range communication interface that is to be used based on: 1) the amount of data being transmitted; and 2) a determined urgency of the measurement data. For instance, if the amount of data to be transmitted is above a threshold, one or more long-range communication interfaces may be disqualified. In some embodiments a default long-range communication interface may be selected by the gateway device, such as based on: which long-range communication interfaces are available, and the amount of data to be transmitted.

At block 445, data, as analyzed and processed by the operator-specific application, may be stored, discarded, or transmitted. For example, if averaged data is only periodically transmitted, the measurement data received and processed by the operator-specific application may be stored for a batch transmission, averaging, or another form of combination with other measurements (in such situations, block 440 may not be performed). In some situations, the data may be discarded (in such situations, block 440 may not be performed). For instance, the measurement may be evaluated against a threshold. Depending on the result, the measurement may be discarded (i.e., not stored or transmitted). In other situations, the measurement or a calculated value based on the measurement may be transmitted using a selected or default long-range communication interface.

Method 400 may be continually repeated for measurements made by different sensor devices. Since measurements from different sensor devices are handled differently, while a first measurement may be passed to a locally-executed operator-specific application, a second measurement may be passed to block 450. Method 400 may be interrupted if a security feature indicates that the gateway device may have been moved or attempted to be accessed by an unauthorized party. Such a security violation may result in the gateway device ceasing to perform any of its functions, including executing the operator-specific applications and/or forwarding data packets.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An environmental sensor gateway device, comprising:
a plurality of wire terminals, wherein:
each wire terminal of the plurality of wire terminals is removably attachable with wires that communicate with an environmental sensor;
a plurality of long-range wireless communication interfaces that communicate with one or more remote server systems; and
one or more processors in communication with the plurality of wire terminals, configured to:
determine a plurality of communication interface protocols used by a plurality of environmental sensors connected via a plurality of wires with the plurality of wire terminals;
execute a plurality of operator-specific applications, wherein:
each operator-specific application is mapped to a corresponding environmental sensor of the plurality of environmental sensors;
receive environmental sensor measurements from the plurality of environmental sensors in the determined plurality of communication interface protocols via the plurality of wire terminals;
convert each of the received environmental sensor measurements from the plurality of environmental sensors to a standard format and append a header that indicates a wire terminal of the plurality of wire terminals from which each environmental sensor measurement was received;
determine, based on the wire terminal of the plurality of wire terminals through which an environmental sensor measurement was received as indicated in the header, to process an environmental sensor measurement using an operator-specific application based on a locally-stored communication routing table, wherein:
the locally-stored communication routing table defines whether the received environmental sensor measurements are transmitted or processed locally based on the wire terminal from which each environmental sensor measurement was received;
based on determining to process the environmental sensor measurement, process the environmental sensor measurement using the operator-specific application;
select a long-range communication interface from the plurality of long-range communication interfaces to transmit the processed environmental sensor measurement to a remote server system of the one or more remote server systems based on the wire terminal of the plurality of wire terminals through which the environmental sensor measurement was received and a locally-stored communication routing table; and
transmit the processed environmental sensor measurement to the remote server system using the selected long-range communication interface.

2. The environmental sensor gateway device of claim 1, wherein the one or more processors are further configured to:
cause the processed environmental sensor measurement to be stored by the environmental sensor gateway device based on an instruction of the operator-specific application, wherein
the stored environmental sensor measurement is transmitted as part of a batch transfer of environmental sensor measurements to the remote server system.

3. The environmental sensor gateway device of claim 1, wherein the one or more processors being configured to process the environmental sensor measurement comprises: combining the environmental sensor measurement with a plurality of other environmental sensor measurements received via the wire terminal.

4. The environmental sensor gateway device of claim 3, wherein the one or more processors are further configured to:
cause the combined environmental sensor measurements to be transmitted to the remote server system.

5. A method for using an environmental sensor gateway, the method comprising:
connecting a plurality of wire terminals of the environmental sensor gateway with a plurality of wires that are electrically connected with a plurality of environmental sensors;
determining a plurality of communication interface protocols used by the plurality of environmental sensors connected via the plurality of wires with the plurality of wire terminals;
executing a plurality of operator-specific applications, wherein:
each operator-specific application is mapped to a corresponding environmental sensor of the plurality of environmental sensors;
receiving, by the environmental sensor gateway, environmental sensor measurements from the plurality of environmental sensors in the determined plurality of communication interface protocols via the plurality of wire terminals;
converting, by the environmental sensor gateway, each of the received environmental sensor measurements from the plurality of environmental sensors to a standard format and append a header that indicates a wire terminal of the plurality of wire terminals from which each environmental sensor measurement was received;
determining, by the environmental sensor gateway, based on the wire terminal of the plurality of wire terminals through which an environmental sensor measurement was received as indicated in the header, to process the environmental sensor measurement using an operator-specific application based on a locally-stored communication routing table, wherein:
the locally-stored communication routing table defines whether the received environmental sensor measurements are transmitted or processed locally based on the wire terminal from which each environmental sensor measurement was received;
based on determining to process the environmental sensor measurement, processing, by the environmental sensor gateway, the environmental sensor measurement using the operator-specific application;
selecting, by the environmental sensor gateway, a long-range communication interface from a plurality of long-range communication interfaces to transmit the processed environmental sensor measurement to a remote server based on the wire terminal of the plurality of wire terminals through which the environmental sensor measurement was received and a locally-stored communication routing table; and
transmit the processed environmental sensor measurement to the remote server using the selected long-range communication interface.

6. The method for using the environmental sensor gateway of claim 5, the method further comprising:
causing, by the environmental sensor gateway, the environmental sensor measurement to be stored by the environmental sensor gateway based on an instruction of the operator-specific application; and
transmitting, by the environmental sensor gateway, the stored environmental sensor measurement as part of a batch transfer of environmental sensor measurements to the remote server.

7. The method for using the environmental sensor gateway of claim 5, wherein processing the environmental sensor measurement comprises combining the environmental sensor measurement with a plurality of other environmental sensor measurements received via the wire terminal.

8. The method for using the environmental sensor gateway of claim 7, further comprising:
causing, by the environmental sensor gateway, the combined environmental sensor measurements to be transmitted to the remote server.

9. A non-transitory processor-readable medium for execution by one or more processors of an environmental sensor gateway, comprising processor-readable instructions configured to cause the one or more processors to:
determine a plurality of communication interface protocols used by a plurality of environmental sensors connected via a plurality of wires with a plurality of wire terminals of the environmental sensor gateway;
execute a plurality of operator-specific applications, wherein:
each operator-specific application is mapped to a corresponding environmental sensor of the plurality of environmental sensors;
receive environmental sensor measurements from the plurality of environmental sensors in the determined plurality of communication interface protocols via the plurality of wire terminals;
convert each of the received environmental sensor measurements from the plurality of environmental sensors to a standard format and append a header that indicates a wire terminal of the plurality of wire terminals from which each environmental sensor measurement was received;
determine based on the wire terminal of the plurality of wire terminals through which an environmental sensor measurement was received as indicated in the header, to process the environmental sensor measurement using an operator-specific application based on a locally-stored communication routing table, wherein:
the locally-stored communication routing table defines whether the received environmental sensor measurements are transmitted or processed locally based on the wire terminal from which each environmental sensor measurement was received;
based on determining to process the environmental sensor measurement, process the environmental sensor measurement using the operator-specific application;
select a long-range communication interface from a plurality of long-range communication interfaces to transmit the processed environmental sensor measurement to a remote server system based on the wire terminal of the plurality of wire terminals through which the environmental sensor measurement was received and a locally-stored communication routing table; and
transmit the processed environmental sensor measurement to the remote server system using the selected long-range communication interface.

10. The non-transitory processor-readable medium of claim 9, wherein the processor-readable instructions are further configured to cause the one or more processors to:
cause the environmental sensor measurement to be stored by the environmental sensor gateway based on an instruction of the operator-specific application; and cause the stored environmental sensor measurement to be transmitted as part of a batch transfer of environmental sensor measurements to the remote server system.

11. The non-transitory processor-readable medium of claim 9, wherein the processor-readable instructions wherein processing the environmental sensor measurement comprises combining the environmental sensor measurement with a plurality of other environmental sensor measurements received via the wire terminal.

12. The non-transitory processor-readable medium of claim 11, wherein the processor-readable instructions are further configured to cause the one or more processors to: cause the combined environmental sensor measurements to be transmitted to the remote server system.

\* \* \* \* \*